United States Patent
Sinha et al.

(10) Patent No.: US 10,678,985 B2
(45) Date of Patent: Jun. 9, 2020

(54) METHOD FOR GENERATING THREE-DIMENSIONAL INTEGRATED CIRCUIT DESIGN

(71) Applicant: ARM LIMITED, Cambridge (GB)

(72) Inventors: Saurabh Pijuskumar Sinha, Austin, TX (US); Kyungwook Chang, Austin, TX (US); Brian Tracy Cline, Austin, TX (US); Ebbin Raney Southerland, Jr., Austin, TX (US)

(73) Assignee: ARM Limited, Cambridge (GB)

( * ) Notice: Subject to any disclaimer, the term of this patent is extended or adjusted under 35 U.S.C. 154(b) by 622 days.

(21) Appl. No.: 15/252,592

(22) Filed: Aug. 31, 2016

(65) Prior Publication Data

US 2018/0060475 A1  Mar. 1, 2018

(51) Int. Cl.
| | |
|---|---|
| *G06F 30/34* | (2020.01) |
| *G06F 30/392* | (2020.01) |
| *G06F 30/394* | (2020.01) |
| *G06F 30/3312* | (2020.01) |

(52) U.S. Cl.
CPC .......... *G06F 30/34* (2020.01); *G06F 30/3312* (2020.01); *G06F 30/392* (2020.01); *G06F 30/394* (2020.01)

(58) Field of Classification Search
CPC ............. G06F 17/5068–5081; H01L 27/0207
See application file for complete search history.

(56) References Cited

U.S. PATENT DOCUMENTS

2002/0070775 A1 * 6/2002 Chiu ................... G06F 17/5031
 327/141

OTHER PUBLICATIONS

E Beyne, "The 3D Interconnect Landscape", IEEE Design & Test, vol. 33, No. 3, pp. 8-20, Apr. 2016.
O. Boilloint et al, "A Comprehensive Study of Monolithic 3D Cell on Cell Design using Commercial 2D Tool", 2015 Design, Automation & Test in Europe Conference & Exhibition, pp. 1192-1196, Mar. 13, 2015.
S. Panth et al, "Placement-Driven Partitioning for Congestion Mitigation in Monolithic 3D IC Designs", ISPD'14, pp. 47-54, Apr. 2, 2014.

* cited by examiner

*Primary Examiner* — Jack Chiang
*Assistant Examiner* — Aric Lin
(74) *Attorney, Agent, or Firm* — Nixon & Vanderhye P.C.

(57) ABSTRACT

A method for generating a design for a 3D integrated circuit (3DIC) comprises extracting at least one design characteristic from a first data representation of a design for a integrated circuit (2DIC) generated according to the design criteria required for the 3DIC. Components of the 3DIC are partitioned into groups (each representing one tier of the 3DIC) based on the extracted design characteristic. A second data representation of a 2DIC design is generated comprising multiple adjacent partitions each comprising the component groups for one tier of the 3DIC design together with inter-tier via ports representing locations of inter-tier vias. A placement for each partition is determined separately from a placement of corresponding components of the 2DIC represented by the original first data representation. This approach allows a 2DIC EDA tool to be used for designing a 3DIC.

17 Claims, 11 Drawing Sheets

METHOD FOR GENERATING THREE-DIMENSIONAL INTEGRATED CIRCUIT DESIGN

BACKGROUND

Technical Field

The present technique relates to the field of integrated circuits. More particularly, it relates to a method for generating a design for a three-dimensional integrated circuit.

Technical Background

There is an increasing interest in three-dimensional integrated circuits (3DICs) comprising multiple tiers of active devices and interconnect layers which are connected using inter-tier vias. 3D integration can provide improved performance because the signal propagation delay of an inter-tier via connecting devices in different tiers of the 3DIC is typically less than the delay associated with a conventional interconnect path linking different devices on the same tier.

SUMMARY

At least some examples provide a computer-implemented method for generating a design for a three-dimensional integrated circuit (3DIC) in accordance with predetermined design criteria, the three-dimensional integrated circuit comprising a plurality of tiers of active devices connected by inter-tier vias; the method comprising:

extracting at least one design characteristic from a first data representation of a design for a two-dimensional integrated circuit (2DIC) generated according to said predetermined design criteria, said 2DIC comprising a single tier of active devices;

partitioning components of the 3DIC into a plurality of component groups based on said at least one design characteristic extracted from the first data representation, each component group corresponding to one of said plurality of tiers; and generating a second data representation of a design for a 2DIC comprising a plurality of partitions positioned adjacent to each other, each partition representing a corresponding tier of the 3DIC and comprising the component group for the corresponding tier and inter-tier via ports representing locations of the inter-tier vias for connecting the corresponding tier to another tier, wherein a placement of the component group for a given partition is determined separately from a placement of corresponding components in the 2DIC represented by the first data representation.

At least some examples provide a non-transitory recording medium storing a computer program to control a computer to perform a method described above.

At least some examples provide an apparatus comprising processing circuitry to perform the method described above.

Further aspects, features and advantages of the present technique will be apparent from the following description of examples, which is to be read in conjunction with the accompanying drawings.

DESCRIPTION OF EXAMPLES

Figure 1:
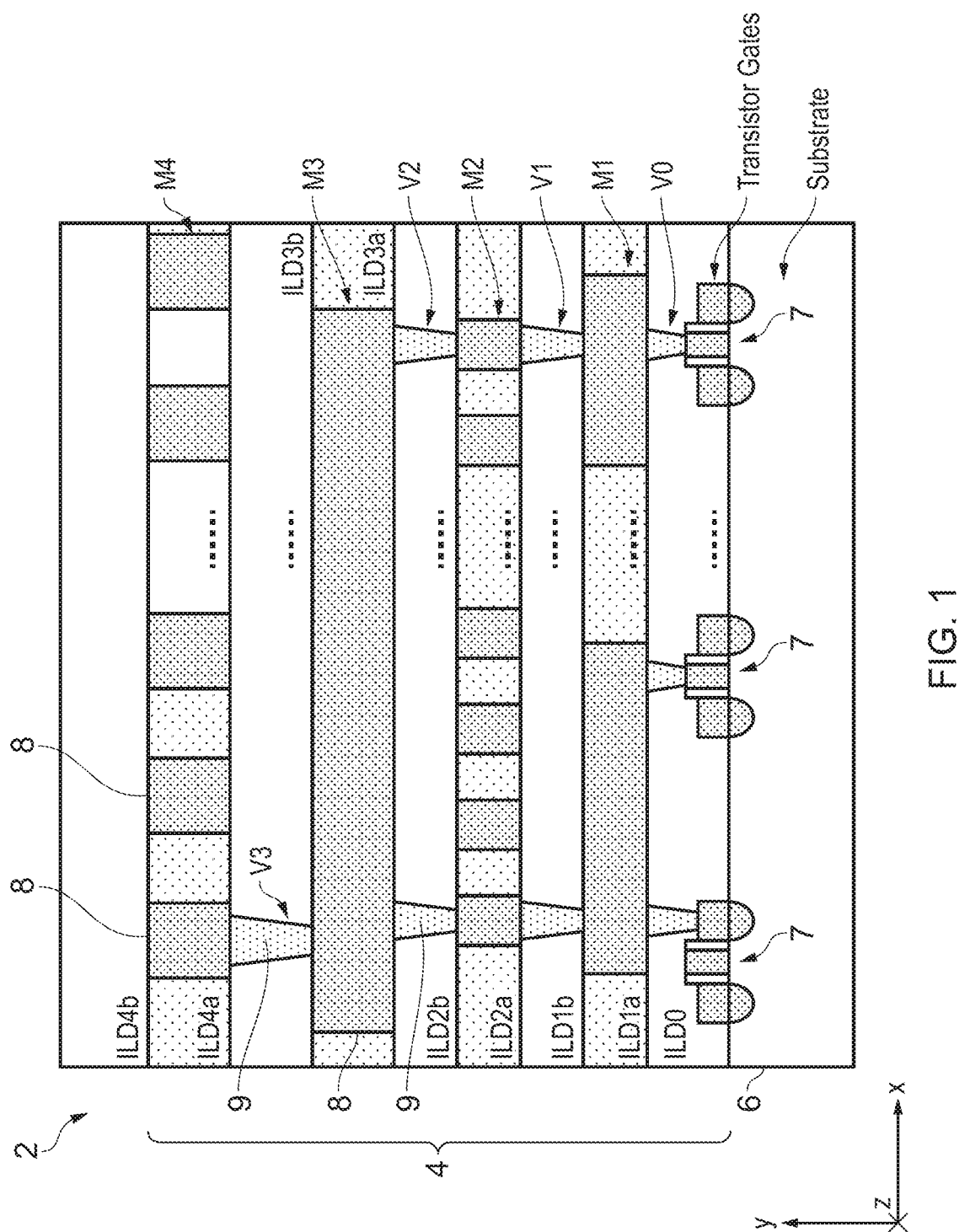
FIG. 1 schematically illustrates an example of a two-dimensional integrated circuit (2DIC)

FIG. 1 shows a cross section of an example of a traditional 2D integrated circuit (2DIC) 2 which comprises a single tier 4 of active devices and interconnects on a semiconductor substrate 6. The active devices are devices which can control the flow of electrons, such as transistors or gates. They are formed directly on the substrate 6. A number of layers of metal interconnects 8 for providing horizontal connections (in either the X direction or the Z direction) between the active devices 7, and vias 9 for connecting between layers of interconnect, are provided above the active layer. The metal interconnects and vias are surrounded by inter-layer dielectric material labelled ILD0 to ILD4b in FIG. 1. FIG. 1 labels the X, Y and Z axes with the Z axis corresponding to the third dimension pointing into the paper. Not shown in FIG. 1 are higher metal stacks with connections to C4 bumps for signal and power to the chip. It will be appreciated that these can also be provided. FIG. 1 shows an example of an integrated circuit stack with four metal layers M1-M4 and corresponding vias V0-V3 to make the connections between the metal layers. In this example metal interconnect layers M1 and M3 run in the X direction while M2 and M4 run in the Z direction.

Figure 2:
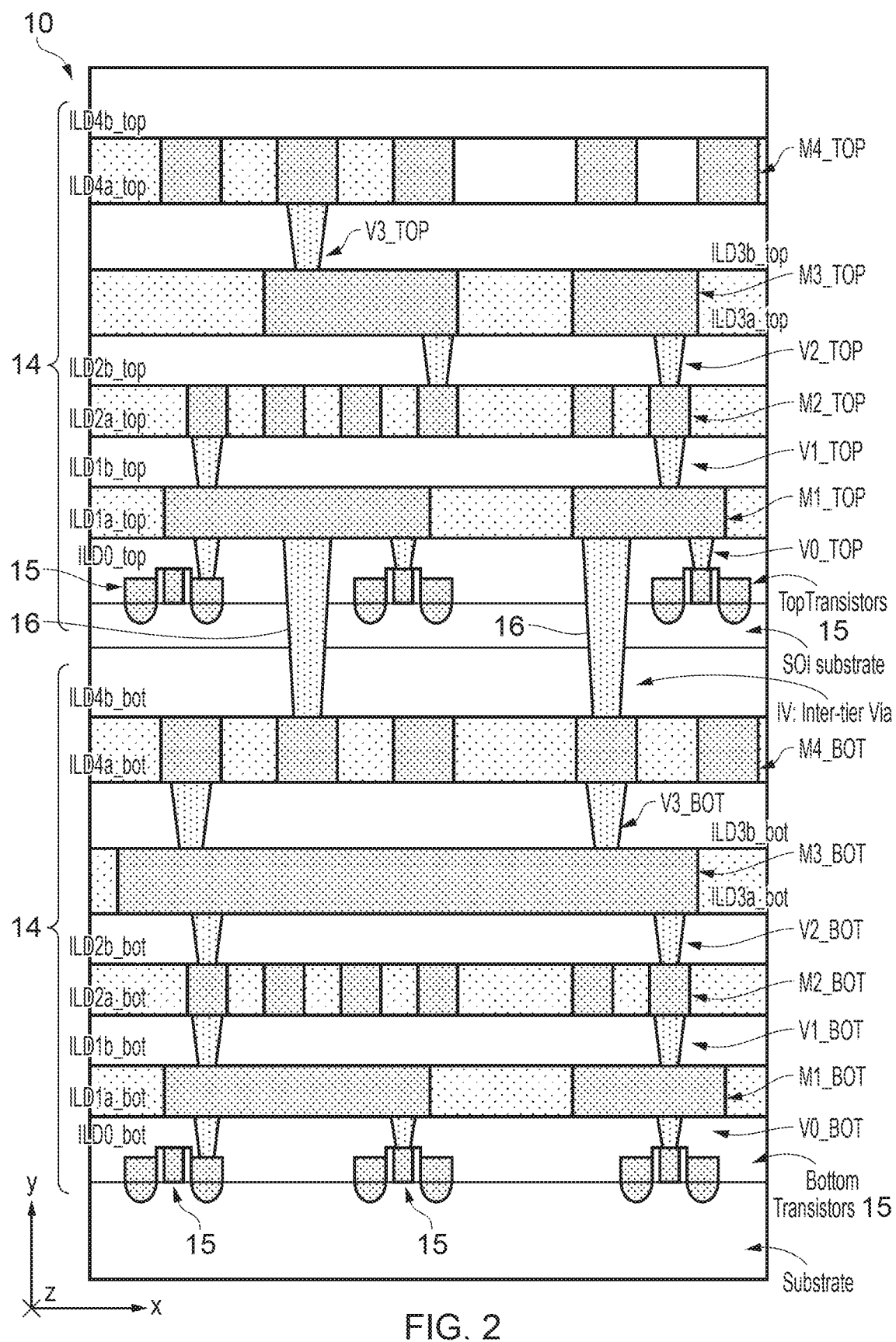
FIG. 2 schematically illustrates an example of a three-dimensional integrated circuit (3DIC)

In contrast, FIG. 2 shows an example of a 3D integrated circuit 10 (3DIC) which comprises two or more tiers 14 of active devices and interconnect layers layered one above the other in the Y direction. In this example, there are two tiers labelled "top" and "bottom". Each tier comprises a layer of active devices (transistors) 15 and a number of metal layers M1 to M4 and via layers V0 to V3. The top and bottom tiers are connected using inter-tier vias 16, which in this example connect the highest interconnect layer M4 of the bottom tier with the lowest interconnect layer M1 of the top tier. Again, in this example metal layers M1 and M3 in the top and bottom tiers run in the X direction while M2 and M4 in both tiers are routed in the Z direction. It will be appreciated that it is not necessary for the corresponding metal layers to run in the same direction in both tiers. Again, C4 bumps for power and for signal (input/output) delivery to the chip are not shown in the drawing for conciseness.

There are a range of technologies available for producing 3DICs. In one technique, two or more pre-fabricated dies, each individually fabricated with corresponding active devices and metal interconnects, can be bonded together after fabrication, with through silicon vias (TSVs) which are pre-fabricated into one or both of the dies providing inter-tier communication between the dies after they are bonded. With this approach, the TSVs are relatively large (e.g. around 10 µm in diameter) to ensure adequate alignment between the dies, since the dies are manufactured separately and then aligned later and so some tolerance in the relative positioning between the dies is required.

In a more fine-grained technique, individual silicon wafers, each separately processed to include active devices and interconnects, may then be bonded together by wafer-to-wafer bonding, before packaging the bonded wafers into a die. This approach can use smaller diameter inter-tier vias with diameters in the range 0.5-1 µm for example.

Another approach is to use a sequential processing technique where multiple tiers of active devices and interconnects are built up layer by layer on a single substrate in a common processing technique. For example, an initial substrate may be processed to provide the first tier of active devices and interconnects, and then the processed wafer may be covered by a thin dielectric layer. An epitaxial layer of silicon is then grown on top of the previous dielectric layer and processed to provide a second tier of active devices and interconnects. Alternatively, a second wafer can be bonded on top of the previous wafer, and then part of the second wafer can be cleaved away after bonding, leaving a thin layer of silicon on top of the previous wafer, which can then be processed to provide the second tier of active devices and interconnects. Either way, as the second tier of active devices and interconnects is processed using the same manufacturing equipment as the initial layer, it can be processed with high alignment accuracy to the underlying layers and this means that much narrower inter-tier vias can be used. Such narrower inter-tier vias may be referred to as monolithic inter-tier vias (MIVs) and can have a diameter of approximately 100 nm or smaller, for example. Having deposited the second tier of active devices and interconnects, further global interconnect layers can be added and the device can then be prepared for further packaging into a semiconductor die.

Hence, a variety of 3D integration technologies are available, and the present technique can be used with any of these. In general, the term 3DIC is used to refer to any integrated circuit which comprises two or more tiers of active devices connected using inter-tier vias. Inter-tier vias can also be known by alternative names such as through silicon vias (TSV) or monolithic inter-tier vias (MIV). The dimensions of the inter-tier vias can range in size as discussed above, and the size and density/pitch of the inter-tier vias can affect at what level a circuit design can be partitioned into tiers. For 3DICs using relatively large inter-tier vias, this can be useful for partitioning large macroblocks (e.g. processor cores, caches etc.) into separate tiers. For example, in a multi-core system-on-chip (SoC) design, one processor core may be on an upper tier and another processor core on a lower tier. On the other hand, with smaller inter-tier vias such as the submicron vias used for a sequential processing technique, this can enable components within a single processor to be partitioned into two or more tiers. Hence, the partitioning between the layers can be at the level of an entire processing core, or in terms of blocks of standard cells, individual standard cells, or at the transistor level.

While FIG. 2 shows an example with two tiers, it will be appreciated that the present technique can also be applied to 3DICs having three or more tiers. Also, FIG. 2 shows an example in which the tiers 14 are stacked face-to-back, that is the face surface of the substrate of the bottom tier (the side of the substrate on which the active devices are formed) faces the back surface of the substrate of the top tier (the side of the substrate which does not have the active devices formed on it). In other 3DIC techniques, it is possible to stack the tiers face-to-face or back-to-back. For example in a face-to-face arrangement, the top tier shown in FIG. 2 would be flipped about the X axis, so that effectively metal layer M4_TOP is closest to metal layer M4_BOT. In a back-to-back arrangement the bottom tier would be flipped about the X axis so that the back surfaces of the respective substrates are facing each other (i.e. in this case M1_BOT would be the closest to M1_TOP). Hence, it will be appreciated that the present technique is not limited to face-to-back stacking as shown in the example of FIG. 2.

Design of integrated circuits is typically carried out using software tools known as electronic design automation (EDA) tools executing on a computer, because as integrated circuit designs become increasingly complex (e.g. they may have millions or billions of transistors), it is typically not practical for a human designer to specify the exact transistor-level layout. EDA tools may be supported by a standard cell library which provides a database of basic blocks of semiconductor components known as "standard cells" which are available for incorporation into a design. For example, a standard cell definition may specify a layout of the transistors and incoming/outgoing connections to be included in the design to provide a certain functionality. When provided with design criteria such as constraints or targets to be met by the design, functionality to be provided by the design, or more detailed specification of components such as logic gates to be included, the EDA tool can select cells from the cell library to meet those criteria, determine a placement of those cells and perform routing to provide connections between the respective cells in order to provide the required functionality. The placed and routed design can then be tested, for example by performing timing analysis on the design to check whether the design meets various timing requirements. For example, signal propagation delays within a design may be tested to check whether data signals reach parts of the design in sufficient time relative to clock signals propagated by the design in order to avoid setup or hold violations. If the design meets its timing requirements then it can be signed off for production while if the design fails, then the design can be modified, for example to include additional buffers to delay signals in order to satisfy the timing requirements.

However, most existing EDA tools are designed solely for use with 2DICs and do not support 3DIC design. Providing bespoke 3DIC EDA tools would be expensive as it would require a significant amount of additional development, which would be costly. Hence, it can be desirable to reuse existing 2DIC EDA tools to assist with the design of a 3DIC. One approach may be to simply generate a 2DIC design according to the design criteria required for the 3DIC, and then simply split the placement determined for the 2DIC in half with the devices in one half of the 2DIC design being placed on the top tier and the devices in the other half of the 2DIC design in the bottom tier of the 3DIC. However, the placement determined for the 2DIC circuit may not be the most efficient way of partitioning devices between respective tiers of the 3DIC since it does not consider characteristics of the respective tiers of the 3DIC (e.g. the bottom tier may suffer from thermal effects more than the top tier as there may be more efficient heat dissipation in the top tier), and cannot consider potential improvements available through the use of inter-tier vias as opposed to longer (and hence slower) horizontal wiring. Also, the placement determined for the 2DIC when split in two separate 3D tiers may not allow efficient inter-tier via connections since the devices in the respective tiers required to be connected to each other may in fact be a long way apart in the horizontal (X or Z) dimension, so that despite the use of inter-tier vias there may still be a requirement for relatively long horizontal wiring.

Figure 3:
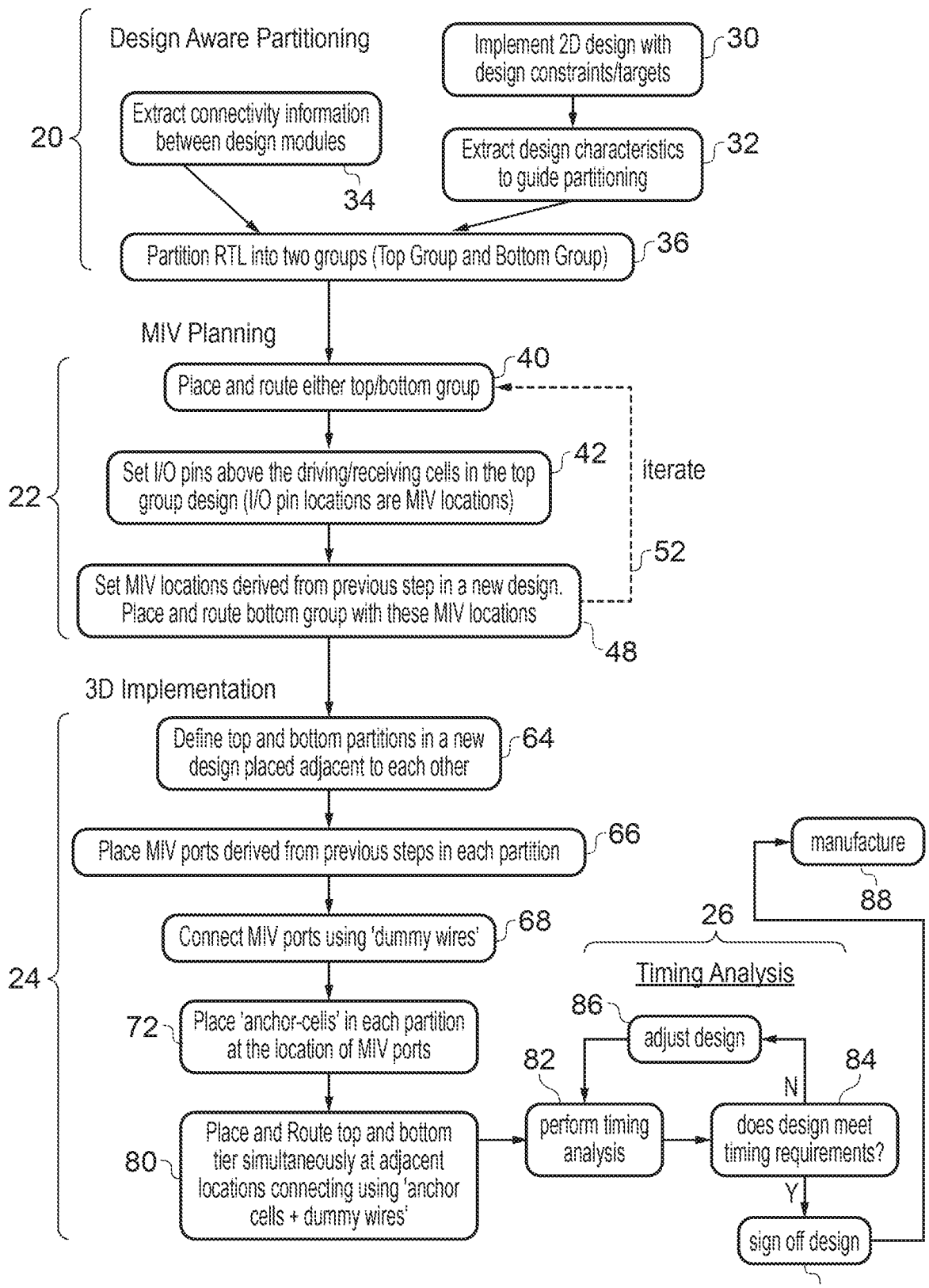
FIG. 3 is a flow diagram illustrating a method for generating a design for a 3DIC using an electronic design automation (EDA) tool designed for 2DIC design.

FIG. 3 is a flow diagram showing an example of a method for generating a design for a 3DIC using an EDA tool intended for 2DIC design. This method allows existing 2DIC tools to be used, not only for generating the 3DIC design, but also performing timing analysis to test the design of the 3DIC, to save costs in developing bespoke tools. Note that while the design being generated is for a 3DIC, as it is being designed using a 2DIC EDA tool the data representation of the design generated by the method is still in a 2D form, with the 3DIC design represented using a number of adjacent partitions in a 2DIC design where each partition represents a corresponding tier of the 3DIC design. Nevertheless, during manufacture of a 3DIC each individual tier of the design can be manufactured based on the layout specified by the corresponding partition of the 2DIC data representation output by the EDA tool.

Broadly speaking, the method comprises a number of stages, including a design aware partitioning stage 20, an inter-tier via planning stage 22, a 3D implementation stage 24, and optionally a timing analysis stage 26. In other examples the timing analysis stage 26 may be omitted, since a separate timing analysis tool could be used to verify the design at a later stage of the design process.

In the design aware partitioning stage 20, at least one design characteristic is extracted from a first data representation of a design for a 2DIC generated according to the same design criteria required to be satisfied for the eventual 3DIC design. Based on the extracted design characteristic, components of the 3DIC design are partitioned into a number of component groups, with each component group corresponding to one of the tiers of the 3DIC design. Then, in the inter-tier via planning stage 22 and the 3D implementation stage 24, a second data representation of a design for a 2DIC is generated which comprises multiple partitions positioned adjacent to each other, with each partition representing a corresponding tier of the 3DIC and comprising the component group which was partitioned in stage 20 for the corresponding tier. The inter-tier via planning stage 22 determines inter-tier via locations for each tier of the 3DIC design and the 3D implementation stage 24 then determines a placement of the component group for each respective partition, based on the inter-tier via locations set in the planning stage 22. The placement determined at stage 24 is determined separately from the placement of the corresponding components in the original 2DIC represented by the first data representation considered in the partitioning stage 20.

This approach has several advantages over the previous techniques. Since design characteristics of a corresponding 2DIC design are extracted and used to partition the components for the 3DIC into groups corresponding to the respective tiers, an improved partitioning can be determined which takes into account factors such as the connectivity between modules of the design, identification of critical paths within the design which should be prioritised in comparison to less critical paths, or thermal behaviour of functional modules in the design, for example. Having partitioned the components into tiers with awareness of characteristics of the corresponding 2DIC, a separate placement of the components in a given tier is then determined, which is independent of the placement of the corresponding components in the original 2DIC. Hence, the EDA tool is not restricted to simply leaving the components of the devices in the same locations at which they were positioned in the corresponding portions of the original 2DIC design as in the alternative approach discussed earlier, but is free to place each partitioned group of components in locations which can help to improve performance for example by reducing the length of interconnections between modules which interact with each other.

Also, by splitting the step of generating the second data representation of the partitioned 2DIC design representing the 3DIC design into an inter-tier via planning stage 22 and a 3D implementation stage 24, this can further improve the efficiency of the eventual placement. The inter-tier via planning stage 22 may initially generate a temporary placement of the component group in a single tier 2DIC design with a smaller area than the 2DIC represented by the first data representation considered in the design aware partitioning stage 20. The locations of the inter-tier vias can then be identified using that temporary placement. In some cases more than one tier of the design may be placed and routed in the inter-tier via planning stage and the process may be iterative where temporary placements for two or more tiers are determined and then the placement determined for one tier is adapted based on characteristics extracted from the placement determined for another tier, to gradually refine the locations of the inter-tier vias so that the design can be made more efficient (for example by reducing the processing delay associated with certain critical paths). Having fixed the locations of the inter-tier vias in the planning stage 22, the 3D implementation stage 24 may then determine the placement of each partition of the 2DIC design with reference to the fixed locations of those inter-tier vias. Hence, in stage 24 this permits the EDA tool to further refine the placement of the components in a given tier with reference to the fixed inter-tier via locations, rather than them being constrained to the temporary placement in the planning stage 22. For example, once the inter-tier via locations have been fixed, the temporary placement considered at the planning stage 22 may no longer be the most efficient placement for a particular tier (because compromises in the inter-tier via locations determined based on other tiers may make it more efficient to update the placement for a given tier), and so by determining a new placement in the 3D implementation stage 24, the design can be made more efficient.

Each stage of the process shown in FIG. 3 will now be described in more detail.

Design Aware Partitioning 20

As shown in FIG. 3, in the design aware partitioning stage 20, a 2DIC design is implemented at step 30 according to the predetermined design criteria required to be satisfied by the eventual 3DIC design. For example the design criteria may specify design constraints or targets to be met by the design and functionality of the design to be provided (e.g. defined using RTL). The 2D design may be implemented using a standard 2D EDA tool using any known technique. Hence, the EDA tool generates a first data representation representing a design for the 2DIC. This 2DIC includes the functionality corresponding to the entire 3DIC to be designed not just a single tier. Hence, the overall area of the 2DIC design represented by the first data representation will typically be larger than the eventual area of the 3DIC design.

At step 32 one or more design characteristics are extracted from the first data representation of the 2DIC design, for guiding partitioning of components of the design into groups corresponding to the tiers of the 3DIC design. In addition, at step 34 connectivity information indicating the number of connections between respective components (e.g. design modules or functional blocks) may be extracted, either from the RTL or another representation of the functional behaviour of the design used as an input to the 2D implementation step 30, or from the data representation of the 2D design created at step 30. At step 36 the connectivity information and the design characteristics extracted at step 32 are used to partition components of the 3DIC represented by RTL for example into two or more component groups (e.g. a top group and bottom group for a two-tier 3DIC design), with each group corresponding to one of the tiers of the 3DIC design.

For example, the design characteristics extracted at step 32 may include any of the following:
1. The logic function of the gates mapped after synthesis.
2. The size of nets in the design (an indication of the fanout of a signal in the design, which can be represented in terms of how many input nodes a given output node is supplied to, or how many subsequent nodes depend on the output of a given output node).
3. Timing information of critical paths and the functional blocks containing the critical paths.
4. Area of each functional block.
5. Number of connections between each pair of functional blocks.
6. Wire resource utilization in each signal connection, e.g. which metal interconnect layers are utilized.
7. Thermal and activity (power consumption) profile of functional modules.

Using the design information knowledge gained from the 2D implementation, the RTL can be partitioned at step 36 into separate component groups to provide a more efficient partitioning considering the design characteristics. In addition the partitioning at step 36 can also consider at least one 3DIC manufacturing process restriction which limits the way in which the 3DIC can be manufactured in practice. For example, the processing restriction may limit the number of available metal layers which can be included in a particular tier of the 3DIC design, or may specify that devices placed on a particular tier may have degraded performance compared to if they were placed on a different tier, so by including such processing restrictions into the partitioning decision, the overall split of the component into groups can be improved.

For example, the partitioning at step 36 may aim to satisfy any one or more of the following objectives:
1. Place functional blocks with multiple critical timing paths in separate groups/tiers.
2. Functional modules with signal feedback between them should be placed in separate groups/tiers.
3. Maximize the number of connections between top and bottom group/tier.
4. Signals traversing up global metal layers (e.g. M5 and above) are candidates for partitioning. For nets in the bottom tier, if there are buffers associated for long wires, place them on the top tier (objectives 1-4 all exploit the property that inter-tier via connections are likely to be faster than intra-tier connections).
5. Place blocks with high thermal/activity profiles on the top tier (where there can be better heat dissipation).
6. Place non-critical paths in the tier with degraded devices.
7. Place large nets in the tier with more metal layers.
8. Balance the area on the top and bottom group/tier (to ensure more efficient use of circuit area, avoiding one tier having large empty areas and hence enabling the overall area to be reduced).

In some cases the partitioning may aim to balance several of these objectives. For example, the partitioning may assign a partition quality score to a given split of the components into groups, based on how many of the objectives are achieved and/or to what extent the objectives are achieved (e.g. based on qualitative indications such as whether devices with high thermal profile have been placed on the top tier, or quantitative indications such as how many connections pass between the top and bottom tiers) The tool may calculate the partition quality score for a number of different options for partitioning the components into groups, and then select the grouping which gives the highest score. As some of the objectives may be mutually exclusive, the eventually selected grouping may be a compromise between the multiple objectives.

Figure 4A:
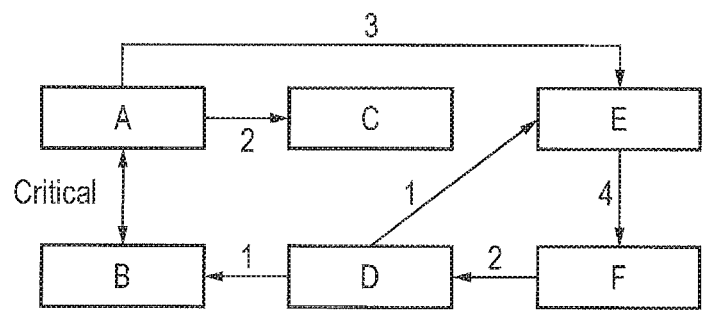
FIGS. 4A and 4B show an example of partitioning components into groups corresponding to respective tiers of a 3DIC, based on a design characteristic extracted from a corresponding design for a 2DIC.
Figure 4B:
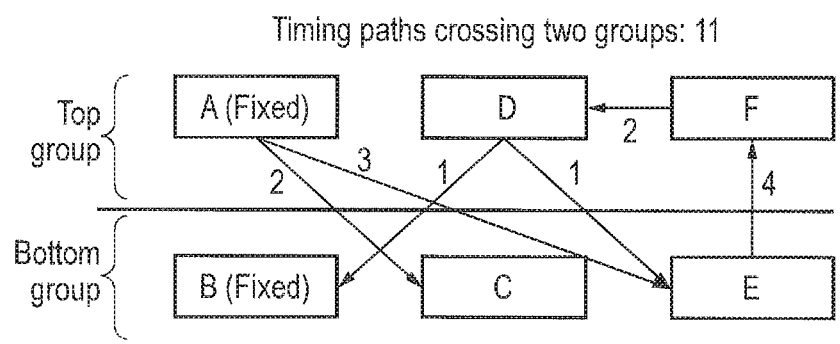

As an example, FIGS. 4A and 4B show a case of design aware partitioning to meet the objectives 1, 3 and 8 shown above. FIG. 4A shows a number of modules A to F of a given design, and based on the 2D implementation of the design determined at step 30 it is identified that there is a critical path between modules A and B. Also the number of connections between respective modules is determined. This is illustrated as an example FIG. 4A using the numbered arrows. For example, module F receives four input connections from module E, while module E receives one connection from module D.

Hence, to meet the requirement that blocks involved in a critical path should be placed in separate groups/tiers, blocks A and B are fixed in different tiers, while the other blocks C to F are free to be allocated to either the top group or the bottom group. In this example in FIG. 4B, by allocating blocks D and F to the top group and C and E to the bottom group, the number of timing paths crossing between tiers can be maximised while maintaining a balanced circuit area for each tier. It will be appreciated that in practice real integrated circuits may have many more than six modules.

An additional criteria to determine partitioning may be checking connectivity between groups of more than two modules. For example, if three modules A, B and C are connected as follows: A→B→C, then while modules A and C do not have an explicit connection, they are implicitly connected through module B and so it can be useful to also consider the relative placing of modules A and C. By placing the intermediate module B in one or other of the groups first and then using this to guide where modules A and C connected to B should be placed, this can result in a more efficient partitioning. For example, module B can be allocated to the top group while modules A and C could be allocated to the bottom group so that both the connection from A to B and the connection from B to C cross between tiers. This exploits the fact that generally inter tier communication will often be faster than wiring travelling horizontally within a single tier.

While the examples above discuss partitioning the components of the 3DIC into groups at a module level (with each module corresponding for example to a group of standard cells that implement a given set of logic functionality), it is also possible to partition the design at a finer-grained level such as at the standard cell or transistor level. Hence, the components partitioned into groups could also be standard cells or transistors.

Inter-Tier Via Planning 22

Figure 5:
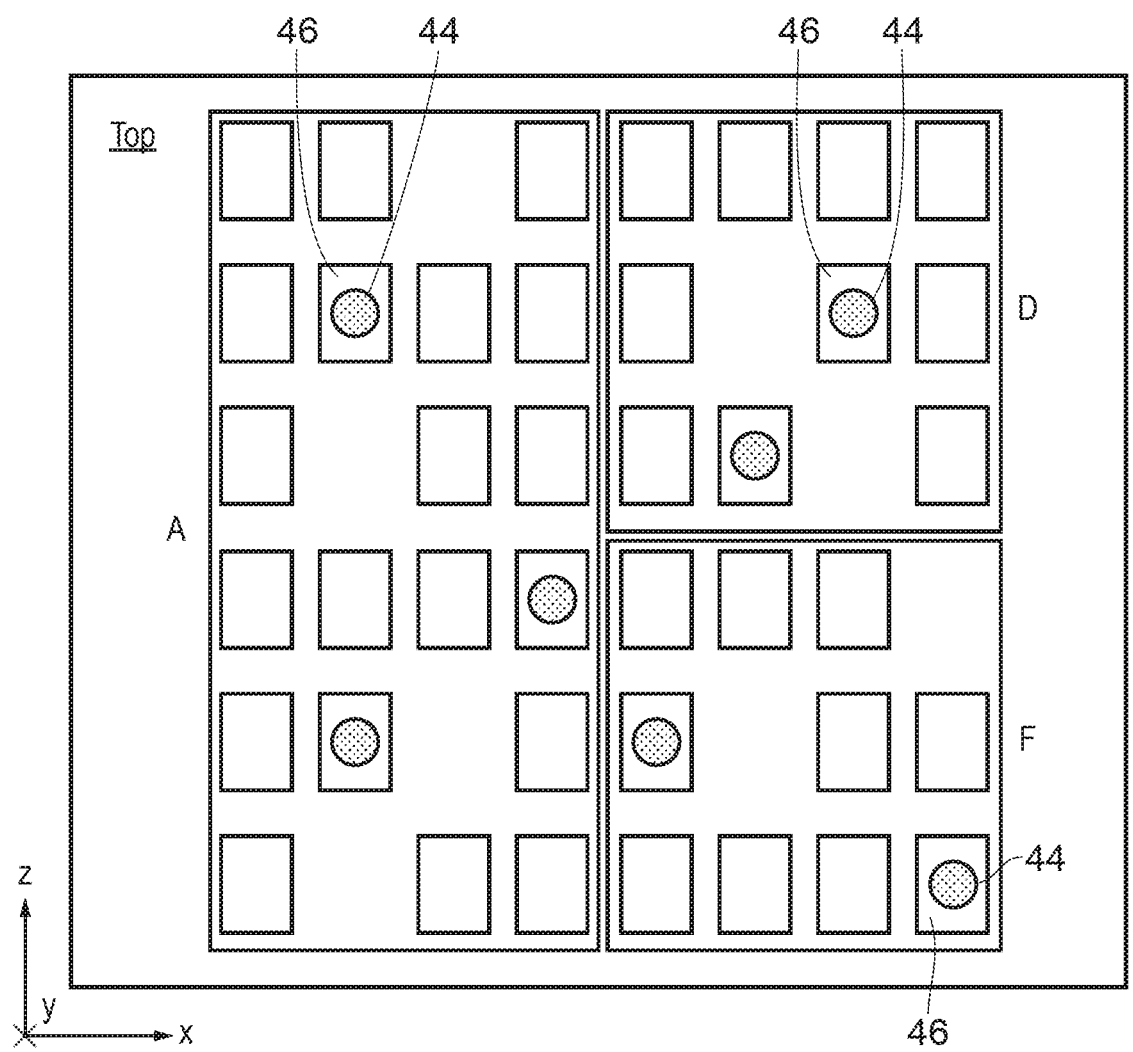
FIG. 5 illustrates an example of determining a temporary placement of a group of components on one tier of the 3DIC and identifying locations of inter-tier vias.

In the inter-tier via planning stage 22, the locations of the inter-tier vias for the 3DIC design are determined. At step 40, placement and routing of the component group determined at the partitioning stage 20 for a given one of the tiers is determined for a new 2DIC design which uses a smaller chip area than the original 2D design represented by the first data representation at step 30. For example, if the 3DIC has two tiers then the 2DIC design formed at step 40 may use 50% of the original 2D chip area, and either the top or bottom tier may be placed first. For example, using the partitioning of modules A to F shown in the examples of FIGS. 4A and 4B, FIG. 5 shows an example of determining a temporary placement for the top tier using the group of components A, D, F allocated to the top group in FIGS. 4A and 4B. This placement is a temporary placement since the actual placement of the corresponding components in the top tier will be determined again in the 3D implementation stage 24. The temporary placement is made for the purpose of fixing the inter-tier via locations, not determining the final chip design. At step 42 of FIG. 3, the connections (inter-tier vias) between the top and bottom tiers are modelled as input/output (I/O) pins 44 (see FIG. 5). However, unlike in a conventional 2D design where an I/O pin port would be placed at the periphery of the design, in step 42 the I/O pins 44 are placed at locations above the driving or receiving cells 46 of the components A, D, F of the tier being designed.

Figure 6:
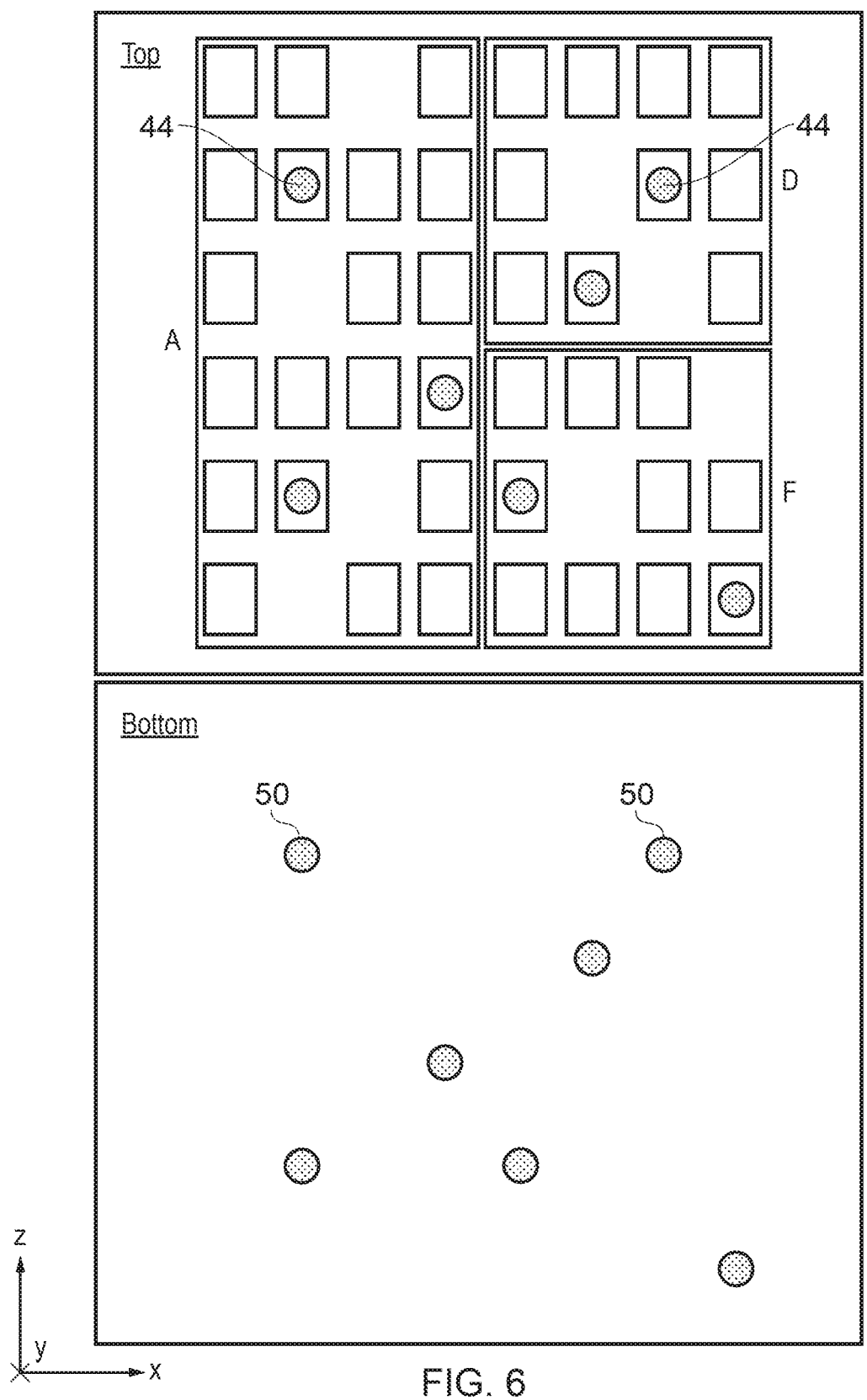
FIG. 6 shows an example of identifying corresponding locations of inter-tier vias in another tier of the 3DIC design.

As shown in FIG. 6, at step 48 of FIG. 3, the inter-tier via locations 44 determined at step 42 are then used to set corresponding inter-tier via locations 50 in a new design corresponding to an adjacent tier of the 3DIC design. The other tier is represented as a separate 2DIC design (not linked to the design of the tier placed first), again with a reduced circuit area compared to the 2DIC design implemented at step 30. As shown in the example of FIG. 6, for a face-to-back 3DIC technology, the coordinates of the inter-tier via locations 50 in the second tier will typically be the same as the corresponding inter-tier via locations 44 in the first tier determined at step 42. However, this is not essential. For example, for a face-to-face or back-to-back 3DIC implementation, one of the tiers may be flipped relative to the other, and so essentially the I/O port locations determined for one tier may be mirrored in the other tier so that they no longer have the same coordinates.

In some implementations, it may be enough to place and route only one tier of a two tier design, or only some of the tiers of a 3DIC design with more than two tiers. For example, the inter-tier via locations of the remaining tiers may simply be fixed with reference to the placement determined for other tiers to which they are connected. However, this may not result in the most efficient inter-tier via locations.

Figure 7:
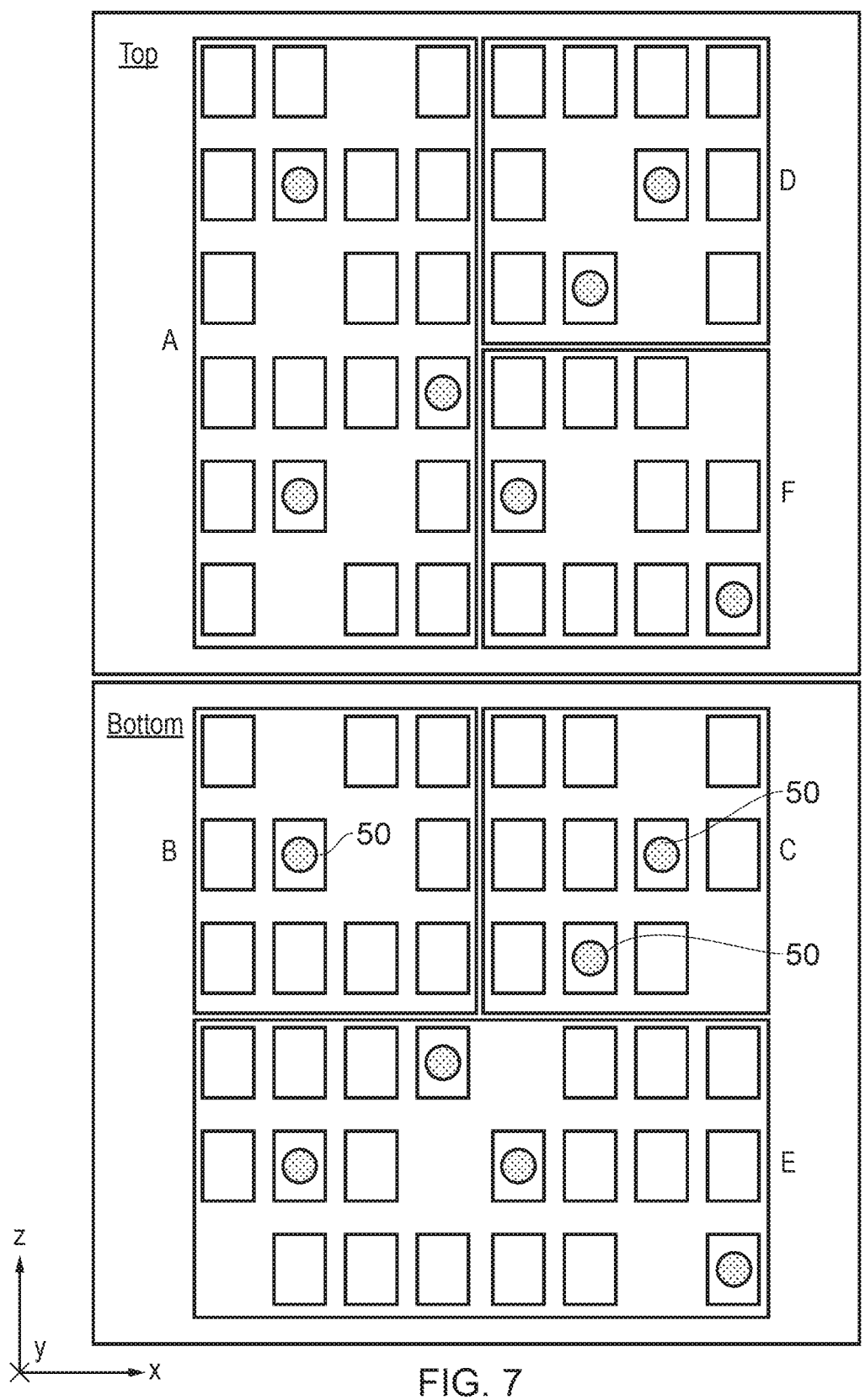
FIG. 7 illustrates an example of determining a temporary placement for the other tier based on the locations of the inter-tier vias.

A more efficient design can be achieved using an iterative approach. Hence, at step 48 having fixed the inter-tier via locations 50, the EDA tool may then place and route the components of another tier with reference to the fixed locations of the I/O ports 50 modelling the locations of inter-tier vias already determined for another tier. EDA placement tools tend to place cells that connect to I/O pins in proximity to the physical location of the pins themselves, to reduce timing delays, and so by modelling the inter-tier via locations using I/O pins, this increases the likelihood that the components which connect to a given inter-tier via are positioned near that via. In the example of FIG. 7, for example, the bottom group is implemented and functional modules B, C, E and their respective standard cells that have connections to the top group are placed in proximity to the corresponding inter-tier via locations. Having placed and routed the bottom group, it may be found that the inter-tier via locations fixed from the placement of the top group do not allow for the most efficient placing of the bottom group of components. Hence, characteristics extracted from the placement of the bottom group can then be used to refine the top group placement and adjust the locations of the inter-tier vias. Hence, as shown by the dashed line 52 in FIG. 3, the process may be iterative where a number of attempts to place and route each of the tiers are made and characteristics learnt from one tier's placement are used to refine the placement of another tier and eventually arrive at locations of the inter-tier vias which enable a more efficient placement across all tiers.

While FIGS. 5 to 7 and FIG. 3 show an example where the inter-tier via locations are determined starting with a top group, it would also be possible to start with a bottom group or any other tier, or to implement both groups iteratively as discussed above.

Figure 8:
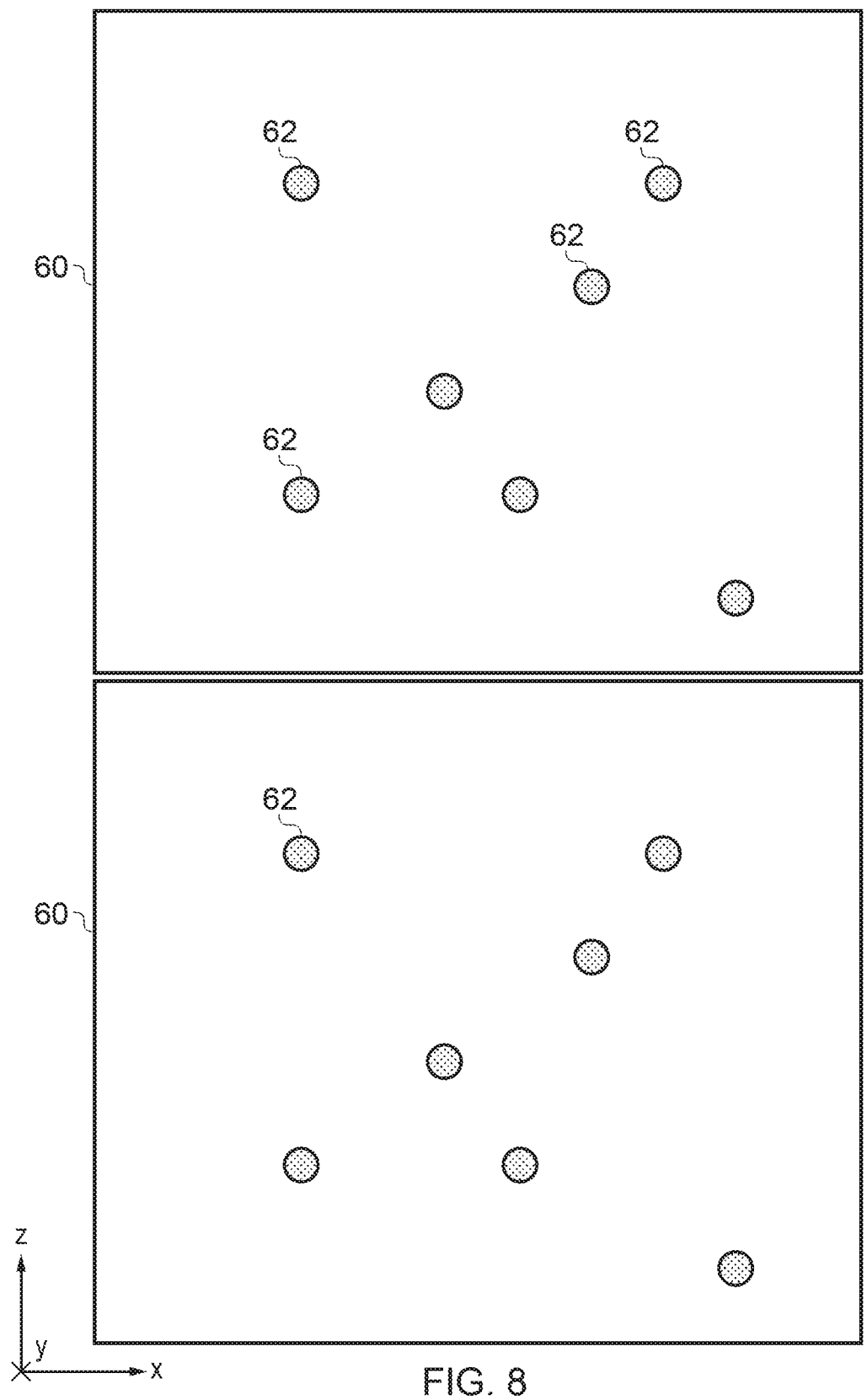
FIG. 8 shows an example of fixing locations of inter-tier via ports in a 2DIC design comprising partitions positioned adjacent to each other with each partition representing a corresponding tier of the 3DIC.

With each tier implemented separately comprising its corresponding partitioned group of components and the inter-tier via locations fixed, as shown in FIG. 8 for the 3D implementation stage 24 only the information about the locations of the inter-tier vias in each tier is retained and the rest of the temporary placement information determined in the planning stage 22 is discarded.

3D Implementation 24

In step 64 of the 3D implementation stage 24, all tiers of the 3DIC are implemented simultaneously adjacent to each other in a single 2DIC design comprising a number of partitions 60 (shown in FIG. 8) each corresponding to one tier of the design. For example, for a two-tier 3DIC design the 2DIC represented by the design implemented at the 3D implementation stage 24 may have an aspect ratio of 2:1 with each tier's partition occupying an area that is 50% of the original design. Similarly, if there are three or more tiers then the aspect ratio may be N:1 and each tier may occupy $1/N^{th}$ of the area of the original 2DIC design represented by the first data representation at step 30. Alternatively, for some designs the partitions may spread in two dimensions (e.g. a 4-tier design could be laid out 2×2). A hard partition is created between the tiers so that the group of components (e.g. cells, functional modules or gates) allocated to a given tier in the partitioning stage 20 gets placed in the corresponding partition 60 of the 2DIC design. As shown in FIG. 8, at step 66 the inter-tier via locations 62 in each partition are fixed first in the new partitioned 2D design, again modelled by I/O ports.

Figure 9:
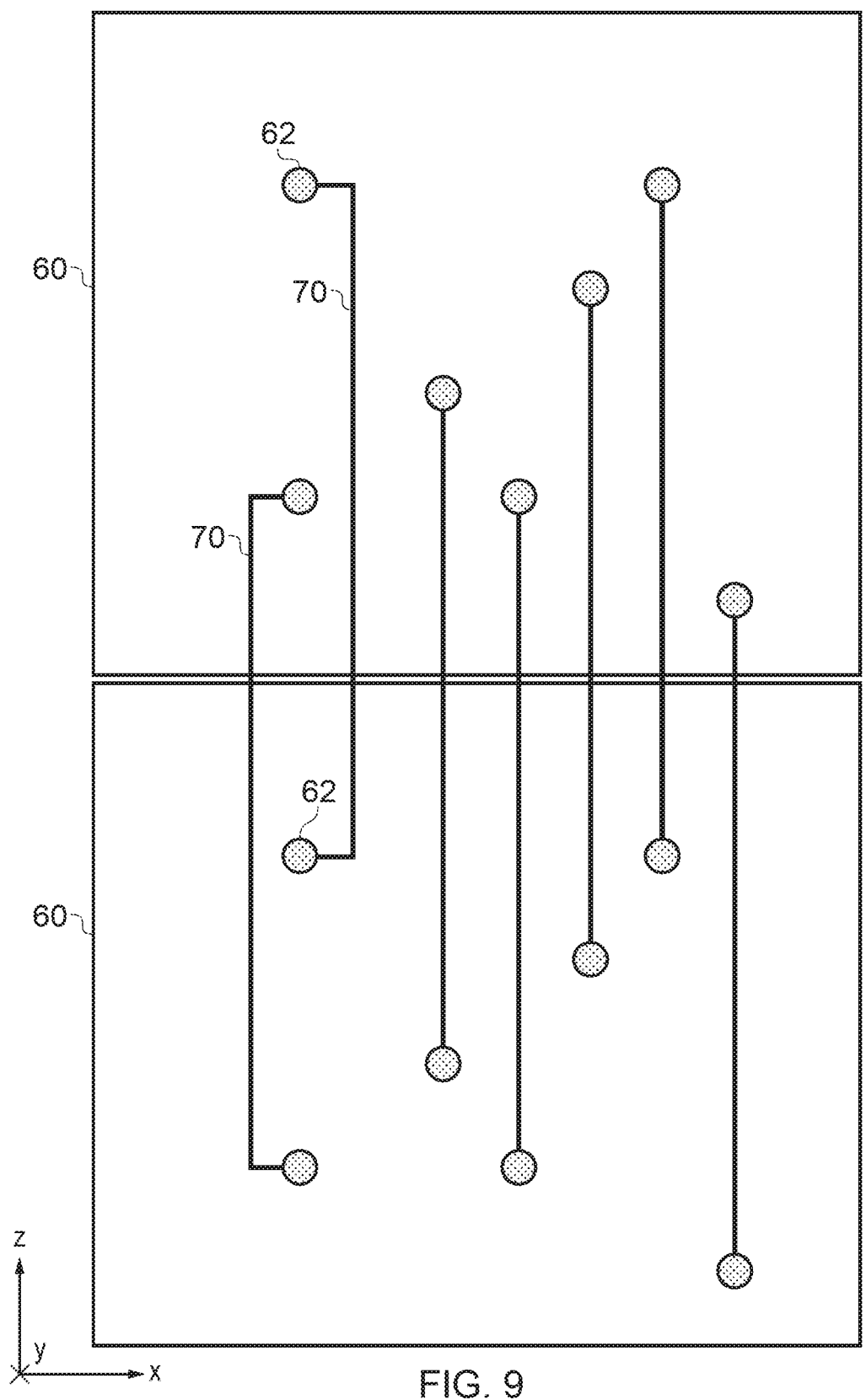
FIG. 9 shows an example of connecting the inter-tier via ports with dummy interconnections.

As shown in FIG. 9, at step 68 dummy interconnections 70 are added between respective inter-tier via ports in different partitions 60, to model the corresponding inter-tier vias. That is, for each inter-tier via of the 3DIC, the corresponding inter-tier via ports in the respective partitions are linked by a dummy interconnection. These dummy interconnections are not used for routing in the actual design, instead they serve to simulate the inter-tier vias for timing analysis purposes. This allows 2DIC timing analysis tools to be used for testing the timing requirements of the 3DIC design represented in partitioned form as a 2DIC design, to avoid needing special 3D timing analysis tools. During the timing analysis, the signal path delay associated with the dummy interconnections can be set to zero, or set to a predetermined inter-tier via delay amount for more accurate margining of the expected delay associated with signals propagating along an inter-tier via.

Figure 10:
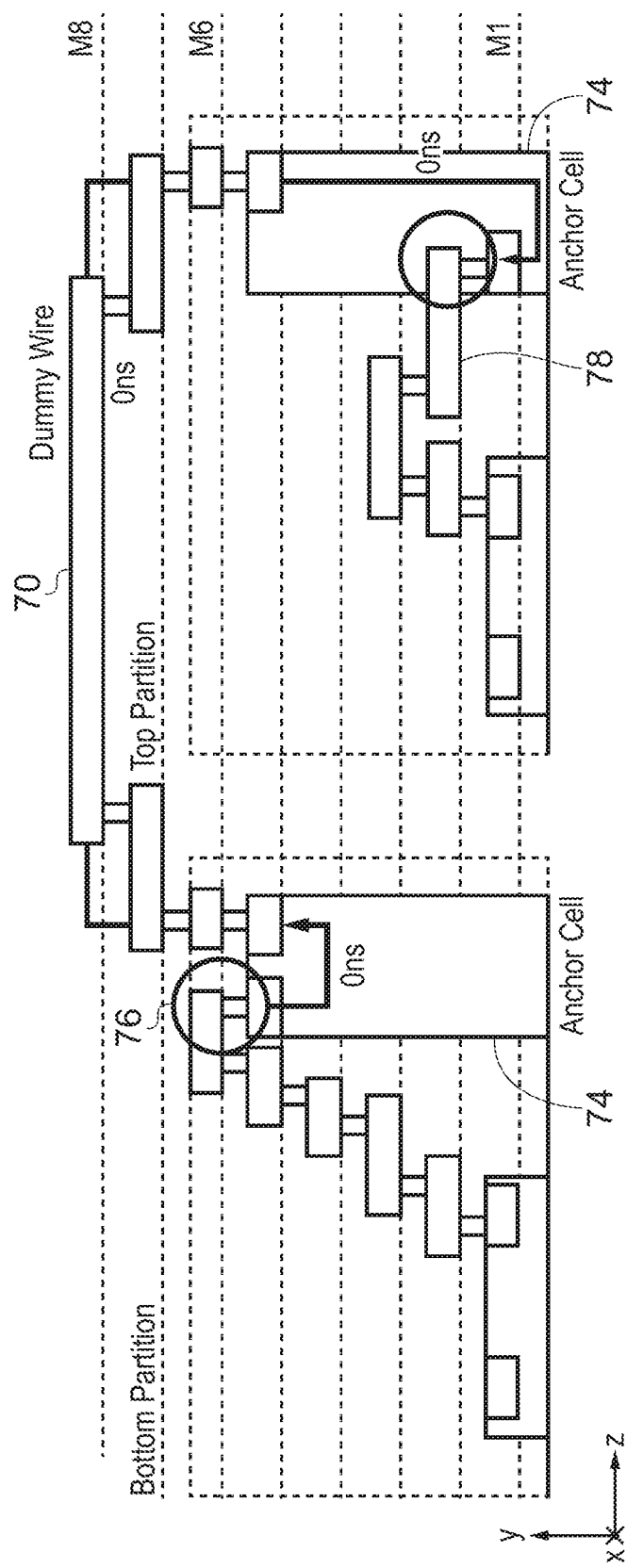
FIG. 10 shows an example of placing anchor cells at the locations of the inter-tier via ports for coupling the dummy interconnections to real interconnections in the design.
Figure 11:
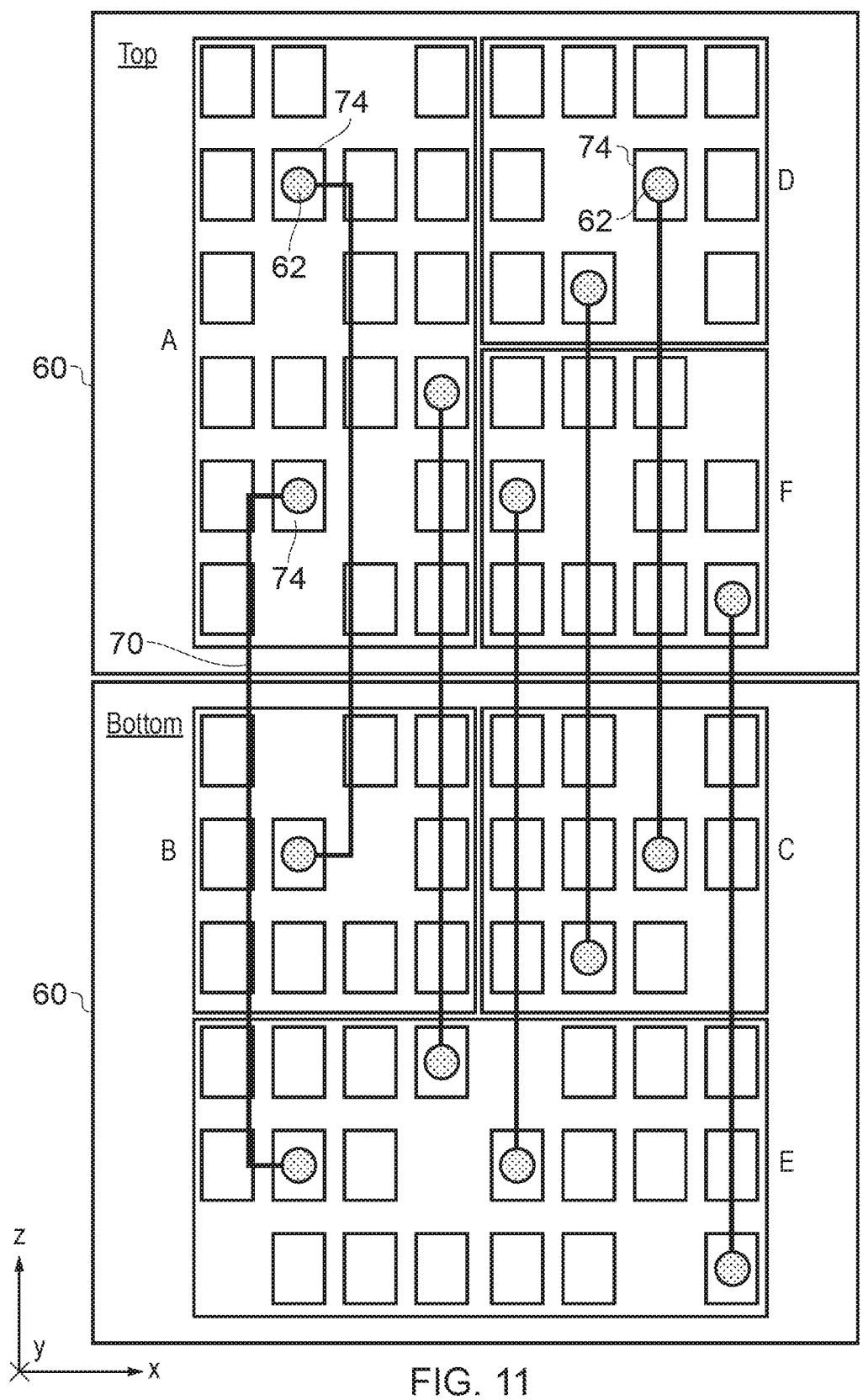
FIG. 11 shows an example of a 3DIC design represented by a second data representation in 2D form, which can be subject to timing analysis to test the design for timing requirements.

As shown in FIG. 10, the dummy interconnections 70 can be implemented using a metal layer which is higher than the highest interconnect metal layer used for real interconnections in the 2DIC design. The choice of which metal layer to use as the dummy interconnect layer may depend on the design characteristics extracted at step 32. For example, if from the original 2D design implemented at step 30 it is determined that the design only uses up to metal layer M6, then metal layers M7 and higher could be used for the dummy interconnections 70 so as not to interfere with the routing of real interconnections in the design.

As illustrated in FIG. 10, at step 72 of FIG. 3, anchor cells 74 are placed at the locations of each inter-tier via port in each of the partitions. The anchor cells 74 are for coupling the dummy interconnection 70 in a dummy interconnect metal layer (e.g. M8 in the example of FIG. 10) to a real interconnection in a lower interconnect metal layer. As shown in FIG. 1 or 2 for example, a given layer of metal interconnect is typically connected directly to adjacent layers of metal interconnect using vias V0-V3, but there is no direct connection between non-adjacent layers. For example, in FIG. 1 metal interconnect layer M2 is connected to layer M3 by via V2 and to layer M1 by via V1, but there is no direct connection between layers M1 and M3 for example. However, when modelling an inter-tier via 16 passing between tiers, the inter-tier via 16 may need to connect metal interconnects which are not in adjacent layers when represented in a partitioned 2D design. For example, as shown in FIG. 2 the inter-tier via 16 links a metal interconnect in layer M1 of the top tier to an interconnect in layer M4 of the bottom tier, and so when these are simulated in a partitioned 2DIC design as shown in FIGS. 8 to 11, then the anchor cell 74 is used to bridge the gap.

For example, FIG. 10 shows an example where in the bottom partition the anchor cell 74 simply connects a real signal wire 76 in layer M6 to a dummy interconnect 70 in layer M8 where standard vias can be used, and so both the input and output ports of the anchor cell 74 can be at the same level (M6 for example). However for the top partition the anchor cell 74 is needed to link an input pin in layer M6 which couples to the dummy wire 70 and an output pin in layer M1 which connects to a real interconnection 78, and standard vias V0-V3 etc. would not be practical as this could interfere with routing of real interconnections in the intervening layers. Hence, the anchor cell 74 simulates the fact that the inter-tier via 16 in the example of FIG. 2 would connect through the semiconductor substrate to the first metal interconnection layer M1.

The anchor cell 74 is effectively a new dummy cell added to the cell library used by the 2DIC EDA tool and it has the following properties:
  its logic function is that of a buffer cell (that is, the output of the cell has the same value as its input);
  it has 0 input-to-output delay and active/leakage power during transition;
  its input and output pins can be on different metal layers.

By providing such anchor cells it is possible to transfer inter-tier via signals in the top tier which arrive at the last metal layer, and together with the dummy interconnects 70 this enables timing analysis to be performed for a 3DIC design using a 2DIC tool.

Also, the anchor cell can be used to enforce a keep out region around the locations of the inter-tier vias to prevent neighbouring cells being placed in regions required to be left empty for the inter-tier vias. This can be done by defining the anchor cell to have a circuit area which corresponds to the area which would be occupied by an inter-tier via in the particular 3DIC technology being used. For example the standard cell library of the 2DIC EDA tool may be provided with multiple versions of anchor cells corresponding to the different forms of inter-tier vias having different diameters as discussed above, and then an anchor cell appropriate to a particular 3DIC technology can be selected from the library when designing chips to be manufactured using that technology.

At step 80 of FIG. 3, a new placing and routing step is then performed for all tiers of the 3DIC design simultaneously, to place and route the group of components allocated to each tier into its corresponding partition 60 of the 2DIC design, again with the placement being performed with reference to the fixed I/O port locations and anchor cells 74 positioned at the locations of each I/O port, and dummy connections 70 linking respective I/O ports corresponding to the same inter-tier via. The final placed and routed design is shown schematically in FIG. 11. Note that the placement and routing determined at step 80 is separate from both the original placement of the 2D design determined at step 30 and also the temporary placement determined in the planning stage 22. While the placement determined at step 80 could still be the same as the placement determined at step 40 or 48, it does not have to be the same, and the freedom to recalculate the placement allows an improved placement to be determined with reference to the fixed inter-tier via locations for example to minimise signal propagation time within the design. The placed and routed 2DIC design determined at step 80 is represented by a second data representation which is then output for timing analysis.

In the timing analysis stage 26, at step 82 a 2DIC static timing analysis tool is used to test whether the design meets its timing requirements. At step 84 it is determined whether the design meets the timing requirements. If there are any timing violations (e.g. setup or hold violations) then the design fails and at step 86 the design is adjusted to eliminate those timing violations. For example, timing violations can be eliminated by adding additional buffers on data and/or clock paths within the design. In some cases the adjustment of the design may require some parts of the earlier stages 20, 22, 24 to be repeated. Having adjusted the design to eliminate the timing violations, the timing analysis at step 82 is then repeated and the timing analysis loops round steps 82 to 86 until eventually a design is found which meets the timing requirements and at this point at step 87 the design is signed off. At step 88 the second data representation, representing the 3DIC design in a 2DIC partitioned format, can then be used to control the manufacture of the 3DIC itself (although an intermediate step may first be performed to remove the dummy wires 70 and convert the anchor cells 74 to inter-tier vias prior to manufacturing). In practice, the manufacture may typically take place separately from the electronic design process by a different party, so for example the second data representation generated at step 80 may be provided to the manufacturer to control the manufacturing equipment. During the manufacture of the 3DIC design, each tier may be manufactured based on the placement and routing specified for a corresponding partition 60 of the 2DIC design defined as the second data representation.

In summary, this technique enables at least the following advantages:
  It allows block level and gate level 3D implementation using 2D EDA tools.
  It can be used to implement both TSV-based, face-to-face and face-to-back wafer bonding or monolithic 3D inter-tier VIA based designs.
  It allows the chip designer to guide design partitioning.

It can implement and improve layout efficiency of multiple tiers simultaneously.

It is very flexible as it allows any partitioning scheme to be implemented at the RTL level.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer-implemented method for generating a design for a three-dimensional integrated circuit (3DIC) in accordance with predetermined design criteria, the three-dimensional integrated circuit comprising a plurality of tiers of active devices connected by inter-tier vias, the method comprising:

extracting, using processing circuitry, at least one design characteristic from a first data representation of a design for a two-dimensional integrated circuit (2DIC) generated according to said predetermined design criteria, said 2DIC comprising a single tier of active devices;

partitioning, using the processing circuitry, components of the 3DIC into a plurality of component groups based on said at least one design characteristic extracted from the first data representation, each component group corresponding to one of said plurality of tiers; and generating, using the processing circuitry, a second data representation of a design for a 2DIC comprising a plurality of partitions positioned adjacent to each other, each partition representing a corresponding tier of the 3DIC and comprising the component group for the corresponding tier and inter-tier via ports representing locations of the inter-tier vias for connecting the corresponding tier to another tier, wherein a placement of the component group for a given partition is determined separately from a placement of corresponding components in the 2DIC represented by the first data representation;

wherein said generating the second data representation comprises:

an inter-tier via planning stage comprising determining said locations of the inter-tier vias, and a 3D implementation stage comprising determining a placement of the component group for each respective partition, based on the locations of the inter-tier vias determined in the inter-tier via planning stage;

wherein the inter-tier via planning stage comprises:

determining, for at least one of said plurality of tiers, a temporary placement of the corresponding component group in a single-tier 2DIC design having a smaller area than the 2DIC represented by said first data representation, and identifying said locations of the inter-tier vias using the temporary placement determined for said at least one tier; and wherein the 3D implementation stage comprises:

defining the plurality of partitions positioned adjacent to each other within said second data representation of the design for a 2DIC;

in each of the plurality of partitions, placing said inter-tier via ports at the locations of the inter-tier vias determined in the inter-tier via planning stage; and placing and routing the component groups for said plurality of partitions with reference to the locations of the inter-tier via ports.

2. The method of claim 1, wherein the locations of the inter-tier vias are determined by an iterative process comprising determining temporary placements for two or more of the tiers and adapting the temporary placement determined for one tier in dependence on characteristics extracted from the temporary placement determined for another tier.

3. The method of claim 1, wherein in the second data representation, an inter-tier via for connecting two tiers of the 3DIC is represented as a dummy interconnection connecting the corresponding inter-tier via ports in the respective partitions of the 2DIC corresponding to said two tiers.

4. The method of claim 3, wherein the 2DIC represented by the second data representation comprises a plurality of interconnect metal layers, and the dummy interconnection is allocated to a dummy interconnect metal layer higher than a highest interconnect metal layer used for real interconnections in said 2DIC.

5. The method of claim 4, comprising placing anchor cells at locations corresponding to said corresponding inter-tier via ports in said respective partitions, each anchor cell coupling the dummy interconnection in said dummy interconnect metal layer to a real interconnection in a lower interconnect metal layer.

6. The method of claim 5, wherein the anchor cell has a logic function of a buffer.

7. The method of claim 5, wherein an area occupied by the anchor cell in the design for the 2DIC corresponds to an area occupied by an inter-tier via in the 3DIC.

8. The method of claim 3, comprising performing timing analysis for verifying whether the 2DIC represented by the second data representation meets timing requirements, wherein a path delay associated with the dummy interconnection is set to an inter-tier via delay amount or zero.

9. The method of claim 1, comprising performing timing analysis for verifying whether the 2DIC represented by the second data representation meets timing requirements.

10. The method of claim 9, wherein in response to the timing analysis determining that the 2DIC would fail the timing requirements, the second data representation is updated to modify the design for the 2DIC, and the timing analysis is repeated using the updated second data representation.

11. The method of claim 1, wherein the components partitioned in the partitioning step comprise:

functional blocks or cells; or gates.

12. The method of claim 1, wherein said at least one design characteristic extracted from said first data representation comprises a characteristic of at least one of:

logic function of components of the design;

fanout of signals in the design;

critical paths in the design;

area of components of the design;

connections between respective components of the design;

which metal interconnect layers are used in the design; thermal properties of components of the design; and power consumption of components of the design.

13. The method of claim 1, wherein the partitioning of the components into component groups is also based on at least one 3DIC manufacturing process restriction.

14. The method of claim 1, comprising manufacturing the 3DIC with each tier of the 3DIC manufactured according to the design of the corresponding partition of the 2DIC represented by the second data representation.

15. The method of claim 1, wherein the processing circuitry implements a 2DIC electronic design automation (EDA) tool designed for 2DIC to generate the design for the 3DIC.

16. A non-transitory recording medium storing a computer program to control a computer to perform the method of claim 1.

17. An apparatus to generate a design for a three-dimensional integrated circuit (3DIC) in accordance with predetermined design criteria, the three-dimensional integrated circuit comprising a plurality of tiers of active devices connected by inter-tier vias, comprising processing circuitry to:
  extract at least one design characteristic from a first data representation of a design for a two-dimensional integrated circuit (2DIC) generated according to said predetermined design criteria, said 2DIC comprising a single tier of active devices;
  partition components of the 3DIC into a plurality of component groups based on said at least one design characteristic extracted from the first data representation, each component group corresponding to one of said plurality of tiers; and
  generate a second data representation of a design for a 2DIC comprising a plurality of partitions positioned adjacent to each other, each partition representing a corresponding tier of the 3DIC and comprising the component group for the corresponding tier and inter-tier via ports representing locations of the inter-tier vias for connecting the corresponding tier to another tier,
wherein the processing circuitry is configured to determine a placement of the component group for a given partition separately from a placement of corresponding components in the 2DIC represented by the first data representations;
wherein the processing circuitry is configured to:
  determine said locations of the inter-tier vias in an inter-tier via planning stage; and
  determine a placement of the component group for each respective partition in a 3D implementation stage, based on the locations of the inter-tier vias determined in the inter-tier via planning stage;
  wherein in the inter-tier via planning stage, the processing circuitry is configured to:
    determine, for at least one of said plurality of tiers, a temporary placement of the corresponding component group in a single-tier 2DIC design having a smaller area than the 2DIC represented by said first data representation, and
    identify said locations of the inter-tier vias using the temporary placement determined for said at least one tier; and
  wherein in the 3D implementation stage, the processing circuitry is configured to:
    define the plurality of partitions positioned adjacent to each other within said second data representation of the design for a 2DIC;
    in each of the plurality of partitions, place said inter-tier via ports at the locations of the inter-tier vias determined in the inter-tier via planning stage; and
    place and route the plurality of partitions with reference to the locations of the inter-tier via ports.

* * * * *